Figure 13:
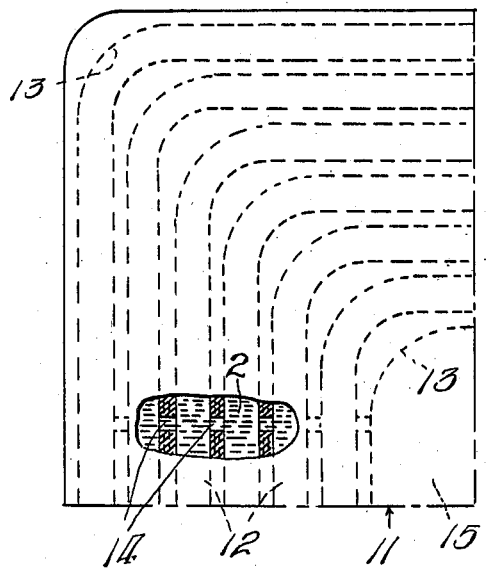

Oct. 29, 1935.  C. B. NORRIS  2,018,736
METHOD OF AND APPARATUS FOR GLUING
Filed May 18, 1933  3 Sheets-Sheet 1
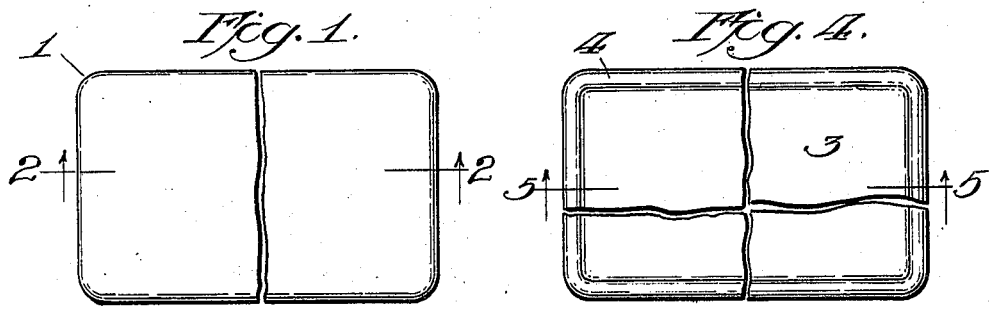
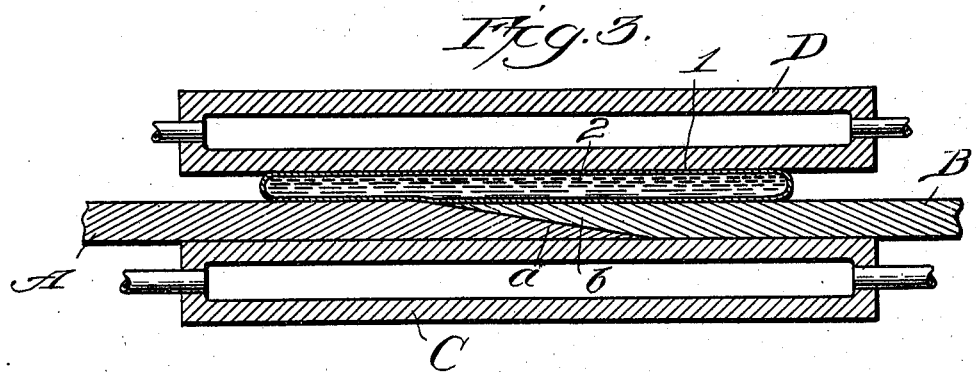
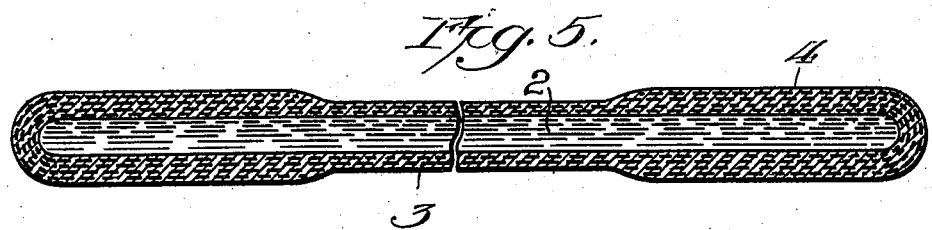
Inventor:
Charles B Norris,
by Wm F Freudenreich,
Atty.

Oct. 29, 1935.       C. B. NORRIS       2,018,736
METHOD OF AND APPARATUS FOR GLUING
Filed May 18, 1933          3 Sheets-Sheet 2
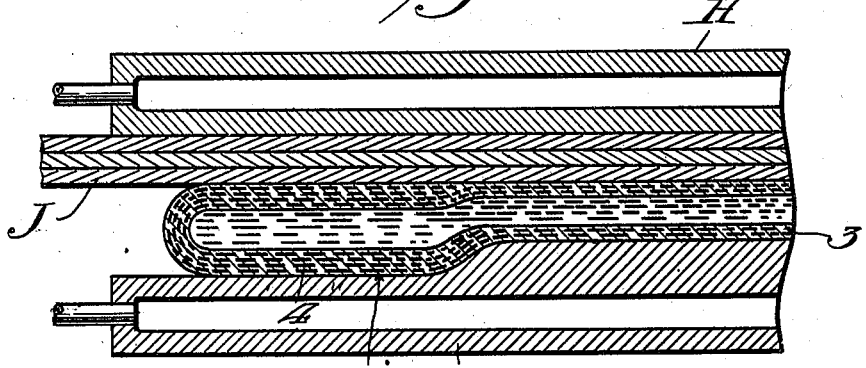
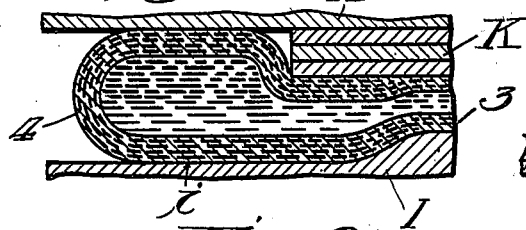
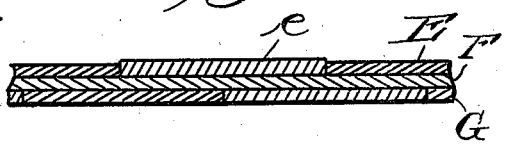
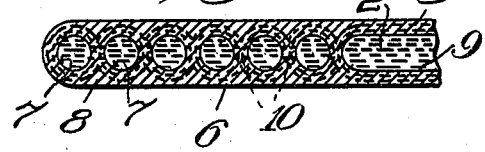
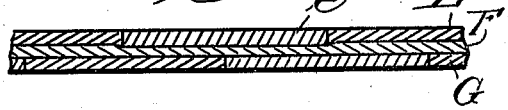
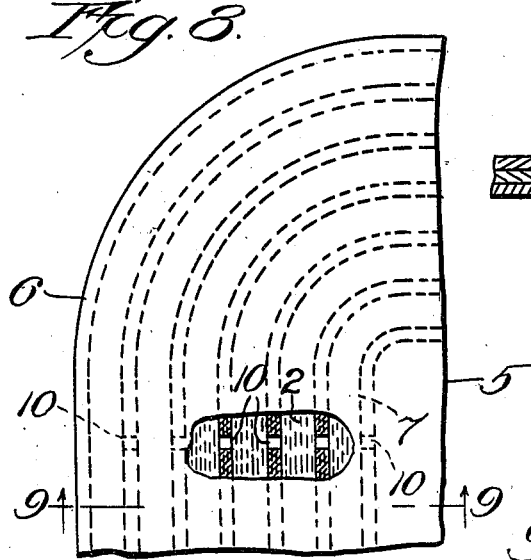
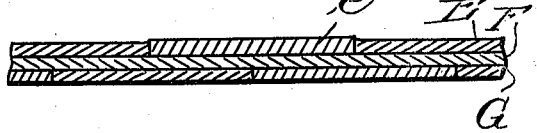
Inventor:
Charles B Norris,
by Wm F Freudenreich
Atty Patented Oct. 29, 1935

2,018,736

UNITED STATES PATENT OFFICE 2,018,736

METHOD OF AND APPARATUS FOR GLUING

Charles B. Norris, Grand Rapids, Mich., assignor, by mesne assignments, to Reconstruction Finance Corporation, a Federal corporation Application May 18, 1933, Serial No. 671,688

2 Claims. (Cl. 144—281)

The present invention relates to the art of gluing and has for its object to overcome serious objections in present modes of gluing multiple-ply panels or scarf joints in panels or work of any kind.

It is probable that no sheet of wood veneer is of exactly the same thickness throughout its entire length and breadth, or that two sheets of such veneer that have presumably been cut so as to be of the same thickness will be exactly alike. Variation in thickness in a given sheet of veneer occurs through unequal shrinkage in drying and through the failure of the cutting tools to cut with mathematical precision. The thicker the veneers the more noticeable are the variations in thickness. For example, commercial veneers having a thickness of from three-sixteenths of an inch to one-quarter of an inch vary as much as two-hundredths of an inch in thickness. It therefore follows that when there are assembled the several plies of a multiple-ply panel, preparatory to gluing, wherein one or more of the plies is made up of a plurality of strips or sections of veneer placed edge to edge, the assembly will usually not be of uniform thickness throughout. Consequently, when the press is closed on the panel, it will not initially press equally on all parts of the panel, but some of the wood must first be crushed to bring out uniformity of thickness before there can be a uniform distribution of pressure and proper gluing. This holds true whether panels are glued one at a time or in stack formation. Another factor that enters into the gluing of panels and causes a crushing of the wood through excessive pressure, is the deflection that occurs in the plates or platens between which the work is clamped. In some instances the deflection is so great that the pressure on the work may be many times as great toward the edges as it is toward the middle; thus necessitating the employment of abnormal pressures in order to obtain sufficient pressure in the areas of lowest pressure. This same crushing of some of the wood occurs when two panels of unequal thicknesses are glued together in a press to produce a scarf joint, because the press must crush the thicker panel, at least along the joint, to reduce its thickness to that of the other panel before pressure can come on the joint.

The pressure that is necessary to crush the wood so as to bring all parts of the work to the same thickness is greater than that required for mere gluing purposes and therefore the excess load thus imposed comprises a waste of energy. Waste of energy is not the only objectionable feature, but the crushing or smashing of the wood damages the latter, at least to the extent of marring one or both faces of the panel wherever abnormally great pressure occurs. A further bad effect from the smashing or crushing of some of the wood in a panel, that I have observed, is that there are set up in the wood internal stresses that cause the panel to warp after it leaves the press; thereby making it much more difficult to produce panels that will remain flat than it would be if all of the strips or sections of each ply of a multiple-ply panel were of equal thicknesses and each was of uniform thickness throughout its length and breadth.

Another disadvantage that results from the aforesaid crushing of the wood in the press is that panels in which some of the wood has been crushed to secure uniformity of thickness will not remain in that condition. Wood that has been crushed or smashed tends constantly to resume its initial form or shape. Therefore, as soon as the press containing one or more panels is opened, the parts of any panel that were initially thick but were compressed into a thinner condition immediately begin to thicken again. This thickening process is very slow and may be said to continue almost indefinitely. For many purposes, after multiple-ply panels have been glued, the faces thereof are sanded to give them a smooth finish. It is now the general practice to allow such panels to season for a few hours, after having been glued, to permit at least a partial restoration of the crushed parts into their original forms or shapes before sanding. Even with this precaution, however, the sanded faces of the panels may not remain smooth and flat because, as stated above, the process tending to restore the crushed wood to its original form or shape continues for a long time; and, therefore, after sanding, those areas where crushing occurred during the gluing operation will continue gradually to rise above the plane of the faces of those areas in which the wood was not crushed.

In order to avoid some of the troubles resulting from non-uniformity in thickness of veneers to be glued, it is now the practice to run the thicker sheets or strips, that must be placed edge to edge with others to form a layer or ply, through a planer before carrying out the gluing process; thereby adding to the expense of manufacturing plywood panels.

It will thus be seen that heretofore, when a good product has been desired, even though the thicker veneers could be planed to make them thinner, there has always been involved the extra handling of the panels and the loss of time due to the necessity for seasoning the panels after they have been glued; and, even then, there has always remained the danger that there would be sufficient subsequent re-thickening of previously compressed portions of a panel to destroy its surface flatness. Furthermore, there has always remained the likelihood that the appearance of one or both faces of a panel would be marred and that the panel would warp because of the crushing or smashing of the wood.

While the difficulties to which I have referred are, in the first instance, due to inequalities of thickness, the actual damage is caused by the excessive pressures. In other words, if uniformity of pressure can be secured, over the length and the breadth of a panel or other piece of work, inequalities in thickness are no longer an obstacle nor are they even of major importance because, if ultimate uniformity of thickness is required, this can be effected by proper sanding. Viewed in one of its aspects, the present invention may be said to have for its object to make it possible to secure an equalization of the pressure on a panel or other piece of work in a press or clamp throughout the length and breadth of the area to be placed under pressure, regardless of variations in thickness found in such piece of work.

Since any deflection of the clamping plates or platens, by which the pressure for gluing is applied, causes an unequal distribution of pressure on the work even though there be no lack of uniformity of thickness in the work, it is not possible to overcome all of the objections to which I have referred unless the effect of such deflection be neutralized. Therefore, viewed in another of its aspects my invention may be said to have for its object to make it possible to secure a uniform distribution of pressure on a piece of work in a press or clamp regardless of the extent to which the plates or platens between which the work is held are deflected.

In carrying out my invention I provide means for applying the pressure of the press or clamping means to the work through a cushion formed with a flexible wall next to the work and having the interior thereof, behind that wall, under hydrostatic compression, while the press or clamping means remains closed on the work. The cushion need not be a part of one of the plates or platens but, if desired, may be a separate unit; the essential thing being that there is a flexible wall next to the work and behind the wall a body that is fluid at the working temperature of the machine or apparatus and that is confined so as to be under hydrostatic compression when the press or clamp is closed on the work. In practice the chamber behind the flexible work-engaging wall is preferably filled with a liquid or with a solid that becomes a liquid under the conditions of use in the gluing process. Where the pressure distributor comprises a separate unit it may be simply a shallow, flat bag or hollow casing composed of flexible material and filled with the fluid or material that becomes a fluid in use.

Therefore, viewed in one of its aspects, my invention may be said to have for its object to produce a simple and novel pressure-transmitting device including a flexible wall and means behind said wall to cause the pressure of a press or the like with which the device is associated to be distributed uniformly across said wall regardless of the configuration which said wall may at any time have.

Figure 14:
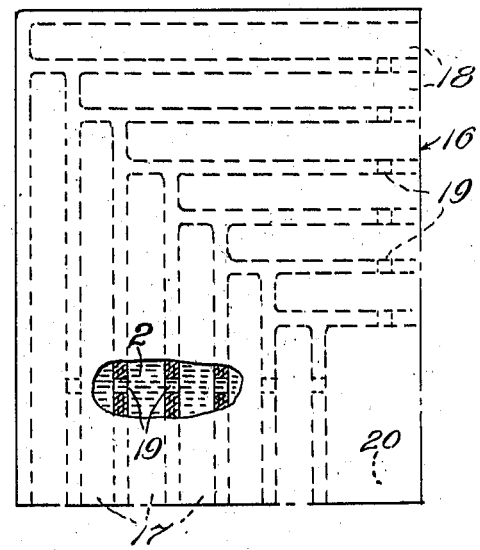
Figure 15:
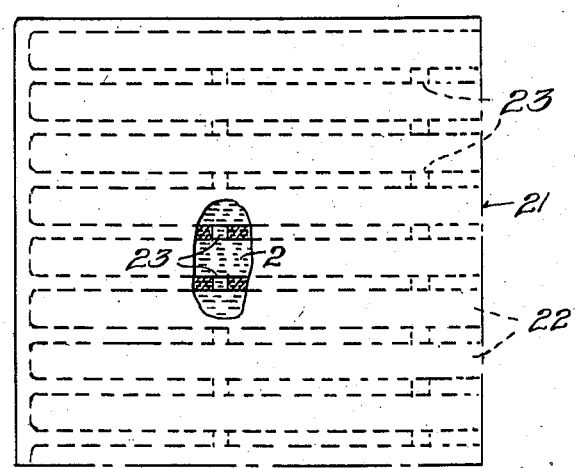

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a plan view of a pad or cushion embodying my invention and constructed as a separate, complete unit; Fig. 2 is a section, on a larger scale, on line 2—2 of Fig. 1; Fig. 3 is a section, on the same scale as Fig. 2, showing the device in a press along with two panels of unequal thicknesses to be connected by a glued scarf joint; Fig. 4 is a view similar to Fig. 1 showing a modification; Fig. 5 is a section, on a larger scale, on line 5—5 of Fig. 4; Figs. 6 and 7 are sectional views showing the use of the cushion or pad of Figs. 4 and 5 under two different conditions; Fig. 8 is a plan view of a fragment of still another form of pad or cushion; Fig. 9 is a section on line 9—9 of Fig. 8; Fig. 10 is a cross section through a fragment of an assembly of veneers to form a three-ply panel, one of the strips in the upper ply being thicker than the adjacent strips; Fig. 11 is a view similar to Fig. 10, showing the condition of the panel at the end of the gluing process as heretofore practiced; Fig. 12 is a view, similar to Figs. 10 and 11, showing the panel as it appears a considerable time after it leaves the press; and Figs. 13, 14 and 15 are views similar to Fig. 8 showing further modifications.

Referring to Figures 1-3 of the drawings, I represents a flat, panel-like hollow pad or shell the walls of which may conveniently be made of thin, flexible sheets of steel. The interior of the pad or shell is filled with or contains a pressure-distributing body 2. This body may be either a liquid, or a solid that will become liquid at the temperatures under which the device is used. In any event, the filler must be either a liquid or a solid at room temperature and at atmospheric pressure to prevent the pad or shell from normally swelling up like a balloon. If the device is to be used in or as part of a hot press, a suitable alloy having a low melting point may be employed. In manufacturing the device, two sheets of steel of the proper size and shape may be laid one upon the other and be welded together at their edges; an opening being left to permit the contents to be inserted; and this opening being afterwards sealed.

It will be seen that when the pad or cushion is laid upon or under a piece of work in a press or clamping apparatus and the latter is closed on the work, the pressure on one side of the work will be transmitted to it through the cushion or pad. The fluid interior of the cushion or pad, being under hydrostatic compression, permits the wall that is in contact with the work to adjust itself so as to conform to the surface configuration of the work and, at the same time, produce a uniform pressure on the work throughout the entire area of contact. The main, although not the only use, for my invention is in connection with gluing multiple-ply panels of wood or other materials or of joining together flat panels or pieces by means of gluing scarf joints and, for the sake of brevity, I shall confine the detailed description to this particular use.

When the work is placed in a press with the pad or cushion interposed between the same and one of the flat faces of the plates or platens and the press is closed: One face of the work can adjust itself to the adjacent flat face of the press while the opposite face need not be flat because it is in contact with the yieldable pad or cushion. For example, if two panels, such as indicated at A and B in Fig. 3, are to be joined by a scarf joint produced by gluing together two overlapping marginal sections $a$ and $b$, respectively, it is unnecessary that the panels be of the same thickness in order to apply the proper pressure to the joint without first crushing the thicker panel. In Fig. 3 the panel A is shown as being thicker than the panel B. The two panels, with their sections a and b, properly overlapping, are shown as resting upon the lower hot plate C of a press, while the pad or cushion 1 overlies the panels at the joint and underlies the upper hot plate D of the press. When the plates C and D are forced toward each other by any suitable means, which I have not shown, the cushion or pad becomes deformed; the pressure first coming on the cushion or pad over that portion that overlies the panel A and causing the fluid to be squeezed laterally so as to permit the remainder of the cushion or pad to thicken. As soon as the cushion or pad has adjusted itself so that it makes contact with the work along its entire under face, while its upper face is in contact with the upper hot plate or platen, further pressure on the hot plates or platens tending to force them together is transmitted uniformly over the entire area of the work corresponding to the length and breadth of the flexible cushion. No greater pressure is required than that which must be applied to the meeting faces of the joint in order to effect proper gluing, so that there is no loss of energy and no smashing or crushing of the wood of the thicker panel as would be the case if the pressure-distributing pad or cushion were omitted and the panels had to come in direct contact with both of the hot plates or platens. It will also be evident that if the pressure were being used in gluing a large plywood panel or a stack of such panels, the presence of the flexible pressure-distributing cushion or pad above or below the panel or the stack would act in the same way as in the gluing of the scarf joint, so that effective gluing would be obtained without crushing any of the wood. Furthermore, assuming that in the gluing of a large plywood panel or stack of panels there should be considerable deflection of the middle portions of the clamping plates or platens, it is evident that this would not relieve the pressure in the center of the upper and lower faces of the work, because the flexible pressure-distributing cushion would simply adjust itself to the altered conditions as the deflection progressed and would maintain a uniform, even distribution of pressure on the work.

In Figures 10, 11 and 12 I have illustrated in an exaggerated way what happens when plywood panels are made from veneers that produce inequalities in the thickness of the assembled plies ready for gluing. In Fig. 10, three layers or plies E, F and G are shown laid upon each other, at least the upper ply being composed of strips or sections laid edge to edge, and one of the strips or sections e being thicker than the adjacent strips or sections. It is evident that if this rudimentary panel is placed between the plates C and D and the latter are closed upon the panel, resistance will be encountered as soon as the thicker part of the panel whose area corresponds to that of the strip e comes into contact with both plates. Before any pressure can be applied to the rest of the panel, this thickened portion must be crushed or smashed to bring it to the same thickness as the remainder of the panel, as indicated in Fig. 11. After the panel has been out of the press for some time, the crushed or smashed portion will be found to have returned at least partially to its original shape or form, as illustrated in Fig. 12. Therefore, if the glued panel was sanded shortly after having been removed from the press, so as to give its faces a smooth finish, its surface will no longer be smooth and flat but will bulge where the crushing of the wood occurred. The return of the crushed portions of the wood to their original forms or shapes progresses slowly, so that panels would have to be stored a long time to make certain that there would be no more thickening of parts thereof. When this same panel is glued by placing above or below it in the press a flexible pressure-distributing pad, the condition represented by Fig. 11 is never brought about, but the panel leaves the press in the condition indicated in Fig. 10. The panel can now be sanded so as to bring the face of the thicker strip e flush with the faces of the adjacent strips, with the assurance that the face of the strip e will not subsequently elevate itself and mar the face of the panel.

It is evident that when the wood in a part of the panel has been compressed, as explained in connection with Figs. 10-12, the compression in the direction at right angles to the plane of the panel is accompanied by an expansion of the same wood in the plane of the panel. Therefore, there are internal stresses set up in the plane of the panel that in many cases cause the panel to warp. When the panel is glued in accordance with my invention, however, all parts of the panel are subjected to the same pressure and therefore there is an entire absence of what may be termed the special internal stresses set up in areas where there must be an actual crushing or smashing of the wood in the gluing operation.

In Figs. 4 and 5, I have illustrated another type of flexible cushion or pad in which the shell or casing 3 is composed of reinforced sheet rubber that may conveniently consist of layers of fabric embedded in the rubber as in the case of rubber hose or automobile tire casings. The body portion of the shell may be comparatively thin but the marginal portions are required to be strong enough to resist heavy pressures, and I therefore thicken the fabric along the edge of the shell or casing and along the adjacent marginal portions on both broad faces, as indicated at 4. One of the pressure or clamping plates or platens is preferably cut away to accommodate the thickened portion of the cushion or pad 3. As shown in Figs. 6 and 7, the upper platen H is flat as is the platen D in Fig. 3, whereas the lower platen or plate I has its face cut away along all four sides, to provide a depressed portion i in which the thickened part of the cushion or pad can seat itself while the entire upper face adjusts itself into a single plane for engagement with the under side of a panel or panels the upper side of which engages directly with the plate or platen H. By cutting away the lower plate or platen in this way, it becomes possible to glue panels that are longer than the press so that first one end of such a panel may be placed in the press and glued and then the panel be drawn along so as to bring an adjacent unglued portion within the press. In Fig. 6, I have shown a long panel J that projects beyond the press. It will be seen that the pad or cushion acts in just the same way as though it were the simple flat pad of Figs. 1 and 2. In the event that a short or a narrow panel is to be glued as, for example, the panel K in Fig. 7, a part of the thickened marginal portion of the pad or cushion may expand until it comes in contact with both of the plates or platens beyond an edge or edges of the panel, as shown in Fig. 7.

If desired, a fabric pad or cushion may be made flat and yet be strong at the edges. Thus, in the arrangement shown in Figs. 8 and 9, the central body portion 5 of the panel may be made of a fabric similar to the thinner fabric of the pad or cushion shown in Figs. 5–7; this central portion being surrounded by a comparatively wide border 6 that may conveniently be formed of strong, flexible conduits 7 adjacent to each other. These conduits may be composed of rubber and fabric in about the same way that rubber hose reinforced with fabric is now made, or they may be of the same construction as fabric fire hose. The border or rim of tubes is preferably embedded in rubber 8 vulcanized upon the same, so that the border may be said to consist of a slab-like section or band of rubber of the same thickness as the body portion of the pad or cushion, filled with tubes or conduits that provide flexibility but are strong enough to prevent the bursting of the pad or cushion along the edge. In order that the contents of the interior of the pad or cushion, including the material that is contained in the tubes or conduits, may be placed under uniform hydrostatic compression in the press or clamping apparatus, the interiors of the conduits or tubes must be interconnected with the chamber 9 in the body of the pad or cushion. In the arrangement shown, the interior of the innermost tube or conduit is placed in communication with the main chamber in the pad or cushion by small openings 10 and it is connected to the next adjacent conduit or tube by similar openings. In the same way each tube or conduit opens into the next tube or conduit outwardly therefrom through any desired number of openings 10.

Although the dimensions of my pads or cushions may be widely varied, it may be stated that presses of the kind shown in Fig. 3, for gluing scarf joints, are often eight to ten feet wide. A pad in the form of a steel shell, as shown, for use in such a press, for gluing by the hot process, in order to operate efficiently need not have an overall thickness in the neighborhood of more than three-eighths of an inch.

The material for filling the interior of the cushions or pads may, of course, be selected in each case because of properties best suited to a given use. When no heat is employed in the gluing operation almost any liquid may be employed as a filler. When the gluing is done by a hot process the filling material should be of a kind that offers little resistance to the passage of heat and the layer of filling material should be comparatively thin and of uniform thickness throughout, so as not unduly to retard the passage of heat nor retard it more throughout some areas than throughout other areas. Furthermore, the filling material employed in a cushion for use in a hot press should have a high boiling point so as not to vaporize and produce excessive vapor pressures when heated by the press. There are various oils that will answer these requirements. When the walls of the cushion or pad are composed of rubber and fabric oil cannot ordinarily be used as a filling material as it is injurious to the rubber. However, glycerine or mercury may be employed instead. In the event that it be desired to employ a filler that is a solid at ordinary temperatures, various alloys having low melting points are available; as, for example, an alloy of lead and bismuth.

It may be desirable, for some purposes, to make a border of tubes so wide that it forms all or the major part of the pad or cushion. In that event the corners cannot be rounded in the manner shown in Fig. 8 or the pad or cushion might be given a shape that is more nearly round than square or rectangular. In Figs. 13–15 I have illustrated several different designs that provide the cushion with comparatively sharp corners; these designs being particularly applicable to the type of pad or cushion just mentioned, although adapted equally well for use in pads or cushions in which the border of tubes is comparatively narrow.

In the pad or cushion 11 of Fig. 13, all of the tubes 12 have corner bends 13 that are alike instead of being arcs of concentric circles. Therefore the corners of the outer tube of the nest of tubes are just as sharp as those of the innermost tube. The tubes communicate with each other through holes 14; and if there is a central cavity or chamber in the cushion, as indicated at 15, the innermost tube of the series communicates therewith, also, through one or more of said holes.

In Fig. 14 the pad or cushion 16 contains tubes that are in straight lengths, closed at the ends. Thus there are straight parallel tubes 17 extending lengthwise of the pad or cushion and similar tubes 18 extending crosswise. The tubes of each set open into each other through holes 19; and, if there be a central chamber or cavity, as indicated at 20, the innermost tube of each set also communicates with that.

In Fig. 15 the pad or cushion 21 is shown as being filled with parallel straight tubes 22 closed at the ends and extending in a single set or series from one side or end of the pad or cushion to the other. These tubes, as in the other forms of pads, communicate with each other through holes 23.

Of course, the tubes in the pads or cushions of Figs. 13–15 and the central cavities or chambers in the pads or cushions, if there be such, contain filling material of any of the types heretofore described, which may be placed under hydrostatic compression in a press and cause the pads to act as pressure equalizers.

I have referred to inequalities of thickness in the work, but it will, of course, be understood that, even without taking into consideration the deflection that occurs in the plates or platens when they are closed upon the work, these members may not be entirely flat and they may not be quite parallel. Consequently, when I refer to inequalities in the thickness of the work, I intend to include also inequalities in the clamp or press that would produce a similar effect upon the closing of the clamp or press on a piece of work.

I claim:

1. A pressure-equalizing pad for use in gluing panels in a hot press comprising a free thin flexible panel-like sealed casing filled with a material that is a liquid at the temperature to which it is raised in the press.

2. A pressure equalizing pad for use in gluing panels in a hot press comprising a free thin flexible panel-like sealed casing filled with a metal having a low melting point.

CHARLES B. NORRIS.